United States Patent [19]

Knapp-Hayes

[11] Patent Number: 5,268,231
[45] Date of Patent: Dec. 7, 1993

[54] METHOD FOR THE TREATMENT OF SURFACES

[75] Inventor: Stephen J. Knapp-Hayes, Halsteren, Netherlands

[73] Assignee: General Electric Company, Pittsfield, Mass.

[21] Appl. No.: 907,952

[22] Filed: Jul. 2, 1992

[30] Foreign Application Priority Data

Jul. 2, 1991 [NL] Netherlands ................... 9101151

[51] Int. Cl.$^5$ .................... B05D 5/00; B32B 27/36
[52] U.S. Cl. .................. 428/409; 427/160; 427/384; 428/412
[58] Field of Search ........... 427/160, 307, 316, 384; 428/409, 412

[56] References Cited

U.S. PATENT DOCUMENTS 4,323,597 4/1982 Olson .................................. 427/160
4,861,664 8/1989 Goossens et al. ................... 428/409
4,937,026 6/1990 Goossens et al. ................... 264/129

FOREIGN PATENT DOCUMENTS 0228671 7/1987 European Pat. Off. .
1312260 11/1962 France .

OTHER PUBLICATIONS

Japan—Derwent Abstract (AN-88-274313 of JP-A-87/0032462).

*Primary Examiner*—Michael Lusignan

[57] ABSTRACT

The invention relates to a method with which an auxiliary substance is provided in the surface of articles having a polycarbonate surface layer. For this purpose the surface to be treated is contacted with the auxiliary substance and a cyclic ketone compound, preferably cyclohexanone. The auxiliary substance may be, for example, a UV-absorption agent or a pigment.

9 Claims, No Drawings

METHOD FOR THE TREATMENT OF SURFACES

The invention relates to a method of providing an auxiliary substance in the surface of an article having a surface which is manufactured from an aromatic polycarbonate.

Such a method is generally know, for example, from U.S. Pat. No. 4,861,664. According to the known method, an article from an aromatic polycarbonate resin is treated with a solvent in which a UV-absorption agent is present. A glycol, a glycol ether, an alcohol, a hydroxy ether, a halogenated hydrocarbon or a ketone or mixtures thereof are used as solvents (liquids). Mixtures of these compounds are also mentioned, for example, a mixture of isopropyl alcohol and methyl ethyl ketone. Various known compounds, for example, (2-2'-hydroxy-3', 5-di(a,a-dimethyl benzyl) phenyl benzenetriazol, are mentioned as a UV-absorption agent. In one of the examples, a plate from an aromatic polycarbonate is treated with a UV-absorption agent in a solvent and is then subjected to a thermoforming treatment. It is stated that products which after the treatment are exposed to elevated temperatures have to be impregnated with "non-volatile" absorption agents.

U.S. Pat. No. 4,323,597 describes a method similar to that described in U.S. Pat. No. 4,861,664. In this method a liquid is used which is non-aggressive with respect to aromatic polycarbonates but which does wet the surface thereof. Suitable solvents according to this prior art are alcohols, hydroxy ethers, alcohol-water mixtures, liquid aliphatic hydrocarbons and chlorine-fluorine carbon compounds. According to this prior art, aggressive substances cause problems, for example, etching, cloudiness and crack formation in the surface.

U.S. Pat. No. 4,937,026 describes a method similar to the one described hereinbefore in which, however, a mixture of dipropylene glycol methyl ether, tripropylene glycol methyl ether, 1,2-propanediol and 1,4-butanediol is used as a liquid.

The invention is based on the discovery that certain liquids, namely cyclic ketone compounds, "treat" the surface of the aromatic polycarbonate in such a manner that the auxiliary substances which are present in the liquid can readily be distributed in a high concentration in the polycarbonate surface. It seems as if the surface of the aromatic polycarbonate dissolves in the cyclic ketone compound. After removing (evaporating) the cyclic ketone a smooth surface remains behind, while the aromatic polycarbonate has not been attacked, as is the case indeed after the treatment with many solvents.

FR-1,312,260 teaches the use of a lot of solvents like cyclohexanone and tetrahydrofurane to swell and partially solve the surface of polymers and to incorporate certain additives into the surface of objects molded out of the polymer. The invention deals specifically with the treatment of objects made of PVC. It could not be predicted that cyclohexanone would also be effective for objects made out of aromatic polycarbonates. In particular not since the Derwent Abstract (AN-88-274313) of JP-A-87/0032462 seems to suggest that cyclohexanone does not effect polycarbonate, more specifically does not produce whitening or crack. Said Derwent Abstract describes the use of cyclohexanone as a solvent for a fluorine resin. The fluorine resin is applied upon the polycarbonate.

The effect of cyclic ketone compounds on aromatic polycarbonate is considered to be surprising.

The method according to the invention is characterised by the use of a cyclic ketone compound or a liquid mixture which comprises a cyclic ketone compound as a liquid. Suitable liquid mixtures comprise at least 30% by volume of the cyclic ketone compound.

Various cyclic ketone compounds may be used, for example, cyclopentanone, cyclohexanone and cyclooctanone. Cyclohexanone is to be preferred.

Various auxiliary substances may be introduced with the cyclic ketone compound into the aromatic polycarbonate surface. It is not necessary for the auxiliary substance to dissolve in the liquid.

By means of the method according to the invention it is possible, for example, to provide the following auxiliary substances: UV-absorption agents, pigments and dyes.

Examples of suitable UV-absorption agents are described in the United States Patent Specifications mentioned hereinbefore. A particularly favourable combination is obtained when using 2-(3'5;-bis(cumyl)-2'-hydroxyphenyl) benzotriazole or 5-t.butyl-3-(2H-benzotriazol-2-yl)-4-hydroxybenzene propionic acid octyl ester. A plate of an aromatic polycarbonate according to the method of the invention treated with this UV-absorption agent is particularly suitable for thermal after-treatment (for example, thermoforming).

Suitable pigments and dyes are, for example, titanium dioxide and other pigments and dyes conventionally used for aromatic polycarbonates. Special optic effects can be obtained by using mica, fine metallic powders, for example, aluminium powder, as an auxiliary substance. When fine fibres, for example, polyamide fibres or polyester fibres are used as an auxiliary substance, a soft-feeling ("suede-feeling") surface may be obtained.

It has also proved possible to use a polysiloxane as an auxiliary substance to make the surface mar-resistant. For that purpose, any of the polysiloxane compounds known from numerous patent specifications for making aromatic polycarbonates mar-resistant is used.

In general, the auxiliary substance to be provided is taken up in the liquid in a concentration of approximately 0.5–20% by weight.

Depending on the nature of the auxiliary substance, the duration of the contact between the surface and the liquid, and the temperature during the treatment, the auxiliary substance penetrates deeper or less deep into the surface. In general the depth of penetration is between 1 and 50 micrometers.

The actual treatment may be carried out in various manners, for which purpose reference is made to the patent applications mentioned hereinbefore. A particularly suitable method is described in EP-A-0228671.

In the method according to the invention a surface of an aromatic polycarbonate is treated. Aromatic polycarbonates comprise carbonate bonds and units derived from one or more aromatic diol compounds. Aromatic carbonates which, in addition to carbonate bonds, also comprise ester bonds derived from an aromatic or an aliphatic dicarboxylic acid are also suitable.

EXAMPLE I

Always 1 gram of a solvent was provided on various horizontally arranged synthetic resin plates of an aromatic polycarbonate derived from carbonyl chloride and bisphenol A having a weight-averaged molecular weight of 32,000. The solvent was allowed to perform its action until it had evaporated (at 32° C.) or it was wiped off after 30 minutes.

After this treatment the synthetic resin plate was evaluated visually. In this manner twenty-four different organic solvents, including methyl alcohol, ethyl acetate, methyl ethyl ketone and cyclohexanone, were tested. Cyclohexanone showed a unique behaviour. It was perceptibly more powerfully active on the surface of the synthetic resin plate and dissolved the polycarbonate more than any of the other solvents. After evaporation of the cyclohexanone the surface remained visually unchanged. None of the other solvents showed such a behaviour: either the surface hardly influenced the surface, or it left clearly visible traces after evaporation (cloudiness, microcracks).

EXAMPLE II

Two different UV-absorption agents as recorded hereinafter in Table A, were dissolved in cyclohexanone (10% by weight). Plates of the same aromatic polycarbonate as described in Example I were treated with the solutions for 45 minutes by means of flow coating. The plates were then dried in an oven at 100° C. (5 minutes).

The surface of the treated plates was evaluated visually: immediately after the treatment and after subsequent thermoforming of the plates (issue rate 1.5, at 190° C.). After thermoforming the plates were then aged artificially (2,500 hours) in a Xenotest 1200 apparatus. The surface was again evaluated.

The benzene propanic acid 3-(2H-benzotriazol-2-yl)-5-(1,1-dimethyl ethyl)-4-hydroxy-1,6-hexanediyl ester attacked the aromatic polycarbonate; the 2-(3'5'-bis(cumyl)-2-hydroxyphenyl)benzotriazole did not. The results are recorded in Table A hereinafter.

TABLE A

| UV-absorption agent | Immediately after treatment | After thermoforming | After artificial ageing and after thermoforming |
|---|---|---|---|
| benzene propanic acid 3-(2H-benzotriazol-2-yl)-5-(1,1-dimethylethyl)-4-hydroxy-1,6-hexanediyl ester | none | cloudiness | no further cloudiness |
| 2-(3'5'-bis(cumyl)-2'-hydroxyphenyl)benzotriazole | none | none | none |

EXAMPLE III

Cyclohexanone solutions were prepared with 3% by weight of a violet dye. A solution having 3% by weight of a red, a blue, and a yellow dye could be obtained by the addition of 25% by volume of isobutanol.

Synthetic resin plates from the same aromatic polycarbonate as described in Example I were treated in the same manner as in Example II.

Evenly coloured plates were obtained after evaporating the cyclohexanone (and isobutanol).

All the Patent Specifications mentioned hereinbefore are considered to be incorporated herein by reference.

I claim:

1. A method of treating the surface of an aromatic polycarbonate, wherein said surface is contacted with a solution comprising: effective treating amounts of
   (A) an auxiliary substance, and
   (B) a cyclic ketone.
2. A method as claimed in claim 1, wherein cyclohexanone is used as a cyclic ketone compound.
3. A method as claimed in claim 1, wherein a UV-absorption agent is used as an auxiliary substance.
4. A method as claimed in claim 3, wherein 2-(3'5'-bis(cumyl)-2'-hydroxyphenyl) benzotriazole or 5-t.butyl-3-(2H-benzotriazol-2-yl)-4-hydroxy benzene propionic acid octyl ester is used as an auxiliary substance.
5. A method as claimed in claim 1, wherein a pigment or a dye is used as an auxiliary substance.
6. A method as claimed in claim 5, wherein a photochromic pigment is used.
7. A method as claimed in claim 1, wherein an aromatic polycarbonate is treated which comprises carbonate bonds and units derived from one or more aromatic diol compounds.
8. A method as claimed in claim 1, wherein an aromatic polycarbonate is treated which, in addition to carbonate bonds, also comprises ester bonds derived from an aromatic or aliphatic dicarboxylic acid.
9. An article obtained by using the method as claimed in claim 1.

* * * * *